May 31, 1966 G. W. BOND, JR., ET AL 3,253,996
PRESSURE SUPPRESSING ARRANGEMENT
FOR NUCLEAR REACTOR PLANT
Filed April 6, 1962 2 Sheets-Sheet 1

WITNESSES
Bernard R. Gieguey
A. J. Santantonio

INVENTORS
George W. Bond, Jr., Gerald H. Farbman,
Leopoldo Chinaglia & Francis S. Bloxman.
BY D. D. Smith
ATTORNEY

United States Patent Office 3,253,996
Patented May 31, 1966

3,253,996
PRESSURE SUPPRESSING ARRANGEMENT FOR NUCLEAR REACTOR PLANT
George W. Bond, Jr., Suffield, Conn., Gerald H. Farbman, Monroeville, Pa., Leopoldo Chinaglia, Turin, Italy, and Francis S. Bloxam, Pittsburgh, Pa., assignors to Westinghouse Electric Corporation, East Pittsburgh, Pa., a corporation of Pennsylvania
Filed Apr. 6, 1962, Ser. No. 185,571
2 Claims. (Cl. 176—37)

This invention relates in general to a pressure suppressing arrangement for a container in which the pressure is derived from a sudden generation of condensible vapors and more particularly to a pressure suppressing system for a nuclear reactor container which encloses a reactor system which uses a high pressure, high temperature coolant and/or moderator such as water, wherein a rupture would pressurize the reactor container from the sudden generation of steam produced by the flashing of the pressurized reactor water leaking into the reactor container from the pressurized water system.

Present day design practice requires that the primary or reactor portion of a plant be contained within a sealed container to prevent the escape of radioactive materials to the atmosphere in case of an accident or rupture in primary reactor system of the plant. For a nuclear reactor, such as the pressurized water type, all of the high pressure components are inclosed in a structure usually referred to as a vapor container. This sealed container is strong enough to withstand the developed pressure following an accident, in which the pressurized water flashes to steam. The vapor container also prevents the spread of radioactive material that the water escaping from the reactor portion of the plant may contain.

The design pressure for the vapor container is based on the total energy released from a maximum credible accident. This accident assumes a rupture of the primary system with the release of virtually all of the available stored thermal energy in the high pressure, high temperature coolant, which generates a large quantity of steam or other vapor from the reactor coolant.

These vapor containers, therefore, represent a substantial portion of the total nuclear plant costs. Because of their size, the vapor containers have a major effect on plant layout and design. Existing practice utilizes large, thin-walled vapor containers in which only a low pressure is developed by the accident because of the large volume enclosed by the vapor container; or small, thick-walled vapor containers are utilized in which high pressures are developed by the accident because of the relatively smaller volume contained by the latter vapor container.

Therefore, a major reduction in the vapor container requirements in either of the thin-walled or thick-walled cases, as by providing an auxiliary means or method of vapor-pressure suppression, would result in more flexibility in plant design as well as substantial savings in plant costs.

Accordingly, it is the general object of this invention to provide a novel pressure-suppressing arrangement for a pressurizable container which may be subject to increased pressurization from a sudden generation of condensible vapors. An ancillary object is the provision of a novel method for suppressing pressure increases in the aforementioned container.

It is a more particular object of this invention to provide a novel pressure-suppressing arrangement for a container of the character described, which encloses the primary system of a nuclear reactor plant.

Another object of this invention is to reduce substantially the design pressure and size requirements of the vapor container of a nuclear power plant, or the like, and thereby to reduce substantially the total plant costs.

Still another object of this invention is to utilize the shielding normally required for the reactor plant in the novel construction of the pressure suppressing arrangement.

Still another object of this invention is to provide a pressure suppressing scheme which is always ready for instantaneous action whenever an accident might occur and which does not rely on any external services or on operator control in order to function immediately upon the occurrence of such accident in the primary system of the nuclear plant.

Still another object of this invention is to utilize less expensive structural material, such as concrete, instead of steel for the vapor container shell as a result of the lower, maximum pressures that can be credibly anticipated as a result of use of the pressure-suppressing system.

Briefly, the present invention accomplishes the above-cited objects by providing an inner container such as, in the case of a nuclear power plant, the radiation shielding which encloses the primary reactor system including the reactor, the heat exchangers, the primary coolant pumps, and the interconnecting piping. An outer container substantially surrounds and is spaced from the inner container. A pool of liquid is then maintained between the inner and outer containers. Ducts or tubes then connect the interior of the inner container with the pool of liquid. The discharge end of each tube is located below the liquid level in the pool and acts as a submerged nozzle.

In case of an accident in which pressurized, high temperature equipment, such as the aforementioned primary reactor system, ruptures within the inner container, the high pressure, high temperature fluid within the primary system escapes into the inner container. The fluid then flashes into vapor, which fills the inner container and which flows from the inner container through the vent tubes into the pool of a relatively cooler liquid maintained between the inner and outer containers, where the vapor is condensed. Non-condensible vapors, such as air and other relatively non-condensible fluids, bubble through the liquid in the pool, are scrubbed and cooled in the process, and then enter a vapor space which in this example is located above the pool and within the outer container. The pressure in the vapor space then builds up until a balance of pressure is reached between the vapor space and the inner container. Therefore, the ratio between the normally unoccupied portions of the inner container volume and the vapor space volume within the outer container is the main parameter determining the final pressure in the entire pressure-suppressing arrangement and hence the maximum required design pressure in the system. The vapor space can be any convenient area located within the outer container and designed or modified to withstand pressure derived from the accident. It can, therefore, readily be seen that after an accident has occurred within the inner container, the pressure within the inner container is maintained at low level by the condensation of steam or absorption of escaping fluid within the pool of liquid between the containers and by conducting the air and non-condensible gases to an unoccupied but enclosed volume outside of the inner container. Therefore, the present invention accomplishes the above-cited objects.

Further objects and advantages of the invention will become apparent as the following description proceeds; and features of novelty, which characterize the invention, will be pointed out in particularity in the claims annexed to and forming a part of this specification.

For a better understanding of the invention, reference may be had to the accompanying drawings in which.

Figure 1:
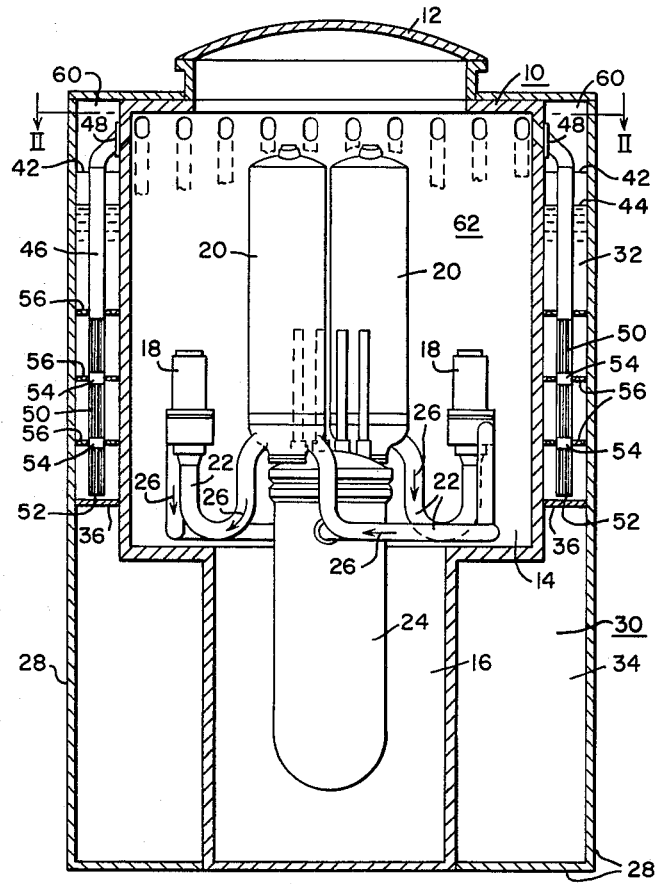
FIGURE 1 is a vertical section through a pressure-suppressing arrangement according to the invention and taken through the inner and outer containers thereof along reference line I—I of FIG. 2.
Figure 2:
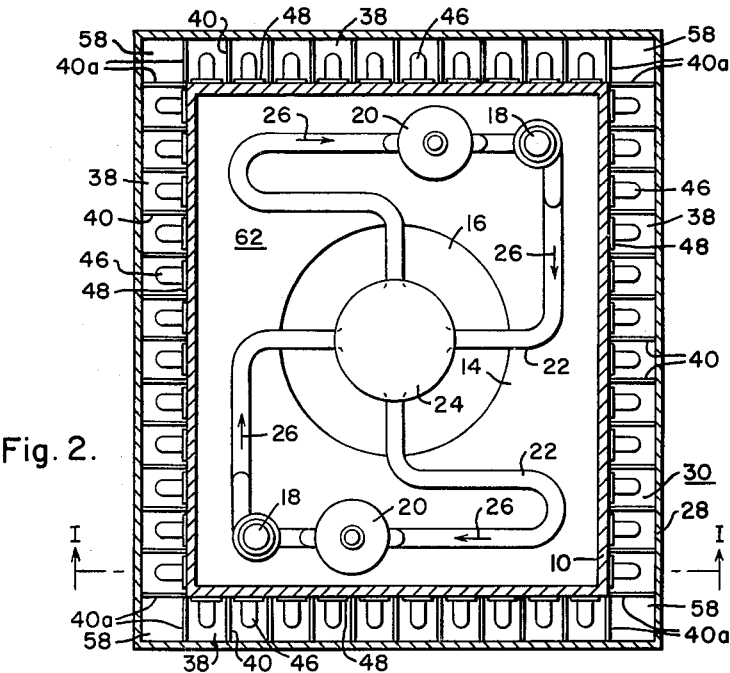
FIG. 2 is a cross-sectional view of the pressure-suppressing arrangement shown in FIG. 1 and taken along reference line II—II thereof; and, FIG. 3 is a simplified vertical view, partially sectional, of another pressure-suppressing arrangement pursuant to the invention.

Referring now to FIGS. 1 and 2 of the drawings, an illustrative example of a pressure suppressing system for use with a nuclear power plant is depicted therein. An inner or reactor container 10 comprises a hatch 12, an upper component portion 14, and a lower reactor portion 16. The hatch 12, located at the top of the reactor container 10, is removable and permits accessibility to the primary or nuclear components contained within the reactor container 10. The component portion 14 of the reactor container 10 is rectangularly shaped and contains the primary system components such as primary coolant pumps 18, steam generators 20 and primary coolant piping 22. The reactor portion 16 of the reactor container 10 is cylindrically shaped and contains substantially all of a reactor 24 with the upper portion of the reactor 24 extending into the component portion 14 of the reactor container 10.

The primary fluid or coolant flow within the primary system is indicated by the flow arrows 26. As shown in FIG. 2, two circulating loops are connected to the reactor 24 in this example, although a greater or lesser number of such loops can be employed as required. In each of the loops the flow is from the reactor 24 to the steam generator 20, from the steam generator to the primary coolant pump 18, and from the primary coolant pump 18 back to the reactor 24.

Surrounding and spaced outwardly from the reactor container 10 is an outer container 28, which is sealably secured to the reactor container 10 and forms an annular chamber 30, as viewed in FIG. 2, between the outer container 28 and the reactor container 10. In this specification the term "annular" is not to be restricted to a member having inner and outer circular peripheries but is also intended to include a member with inner and outer peripheries having a configuration other than circular.

The annular chamber 30 is divided into a plenum chamber 60 to be described hereinafter, an upper pool space or liquid chamber 32, and a lower vapor space 34 formed by an annular divider plate 36 which is sealably secured, as by any well known method such as welding, to the reactor container 10 and to the outer container 28. The pool space 32 is then vertically divided into compartments 38 (FIG. 2) by means of compartment plates 40 which extend upwardly from the divider plate 36 at the lower extremity of the pool space to a point above the pool level, as indicated by the reference character 42, in the upper portion of the annular chamber 30. Each of the compartment plates 40 are secured, but in this example are not sealed, to the reactor container 10 and the outer container 28 and can therefore be utilized in addition as bracing for the inner and outer containers 10 and 28 respectively. Each compartment 38 is filled with a liquid to a level as indicated by reference character 44, which is a short distance below the top 42 of the compartment plate 40. The liquid level 44 is maintained the same in each compartment 38 in each of the four sides separately by leakage between the compartment plates 40 and the reactor container 10 or the outer container 28. However, corner compartment plates 40a are sealed to the containers 10 and 28 to prevent any leakage of liquid into vapor passages 58 to be described hereinafter.

In each compartment 38 is a duct or vent tube 46, which extends downwardly from the upper portion of the reactor container 10 to a point a short distance above the divider plate 36. The vent tube 46 couples the inner volume of the reactor container 10 to the lower portion of the pool space 32. A flange 48 can be used to secure the vent tube 46 to the reactor container 10 if it is so desired; otherwise, the vent tube 46 can be welded to the reactor container 10. In this example of the invention a plurality of apertures or longitudinal slots 50 are cut into each vent tube 46 at the lower portion of the vent tube 46. Peripheral slots or holes can also be utilized in each vent tube 46 in lieu of the longitudinal slots 50. The bottom end of the vent tube 46 is closed by means of an end cap or plate 52. Short section 54 of the vent tube 46 are not slotted to give the slotted portion of the vent tube more rigidity.

A plurality of distribution grids 56 are spaced longitudinally between the slotted portion of the vent tube 46 as shown in FIG. 1. The grid 56 can be a perforated plate or a heavy screen. The purpose of the grid 56 is to break the steam flow passing through the grids 56 into small sized bubbles so as to enhance the heat transfer for condensation of the steam in the liquid surrounding the grids 56. The vent tube 46 passes through each distribution grid 56, but each grid 56 is secured to the vent tube 46. Each horizontally placed grid 56 also extends horizontally over the entire area between the vent tube 46 and its surrounding walls formed by the compartment 38. Each grid 56 also fits slidably against the walls formed by the compartment 38. In this example of the invention, three distribution grids 56 are spaced longitudinally along the slotted portion of each vent tube 46.

When employed aboard a ship, the compartment 38 and the grids 56 sectionalize the annular chamber 30 and the compartment 38 respectively so as to dampen the movement of the water contained in the chamber 30 due to the pitch and roll of the ship.

At each of the four corners of the annular chamber 30 is a vertical vapor passage or conduit 58, which couples a vapor plenum chamber 60 at the top of the chamber 30 with the vapor space 34. The vapor plenum chamber 60 is annular in shape and is disposed generally above the upper ends of the compartment plates 40 and therefore above the liquid level 44. In addition, the divider plate 36 is cut away at the four corners of the annular chamber 30 in order to make it possible for the vapor passages 58 to couple the vapor plenum chamber 60 with the vapor space 34.

Where the weight problem is critical such as aboard ship the material used for the reactor container 10 and the outer container 28 can be carbon steel. However for land-based plants at least the inner container 10 can be fabricated from concrete, reinforced concrete or concrete densified with barytes so that the container can serve as an effective biological shield for the primary reactor system. The liquid in the pool space 32 is located above the vapor space, in this example, to provide additional shielding for the nuclear plant at a location most advantageous to operating personnel. The reactor container 10, the outer container 28, and the liquid in the pool space 32 thus have the dual purpose of acting as shielding and also as integral components for the pressure-supressing arrangement of this invention.

An operational explanation of this invention will now be given. It is first assumed that a rupture has occurred at some point in the primary coolant piping 22. The high pressure, high temperature primary coolant, which in this example is pressurized water, flows from the primary coolant piping 22 through the rupture and into a reactor compartment 62. Upon entering the reactor compartment 62 the pressurized high temperature water flashes into steam. Steam and air then flow from the reactor compartment 62 to the vent tubes 46. The steam-air mixture then flows downwardly in the vent tubes 46 and exits through the slots 50 into the pool space 32. The slots 50 cause the steam-air mixture to break up so as to produce more intimate mixing and enhance the heat transfer for condensation between the steam-air mixture and the liquid, which in this case is water, in the pool space 32. The end cap 52 forces all of the steam-air mixture to flow through the slots 50 instead of out of the end of the vent tube 46.

As the steam-air mixture flows upwardly through the water in the pool space 32, the steam-air mixture comes in contact with the distribution grids 56. The distribution grids 56 further break up the steam-air mixture to an even greater extent, as the mixture passes through the distribution grids 56. Therefore, the steam-air mixture is more intimately mixed with the water in the pool space 32. As the steam-air mixture flows upwardly through the water and the distribution grids 56 in the pool space 32, the steam is condensed and the air is cooled. Simultaneously the air is scrubbed of particulate matter. The cooled and scrubbed air then flows from the pool space 32 into the vapor plenum chamber 60. The air then flows through the vapor plenum chamber 60 to the nearest vapor passage 58 located at one of the corners of the annular chamber 30. The air then flows downwardly through the vapor passages 58 into the annular vapor space 34, where the air is contained.

As the air and any other non-condensible vapors flow into and are compressed within the vapor space 34, the pressure in the vapor space 34 increases until a balance of pressure is reached between the vapor space 34 and the reactor compartment 62. Therefore, the volume ratios between the reactor compartment 62 and the vapor space 34 is the main parameter determining the final pressure in the entire pressure suppressing system hereinbefore described. The vapor space 34 that has been utilized for this purpose can be any convenient unoccupied volume, which is designed or modified to withstand the pressure derived from an accident in the nuclear portion of the plant, which in this example is assumed to be a rupture in the primary coolant piping 22 allowing the high pressure, high temperature primary coolant to escape from the primary system into the reactor compartment 62.

Desirably, at least the outer container 28 is sealably secured so as to be air-tight in order to prevent the spread of radioactive materials resulting from any such accident in the nuclear portions of the plant to areas adjacent to the outer container 28.

Figure 3:
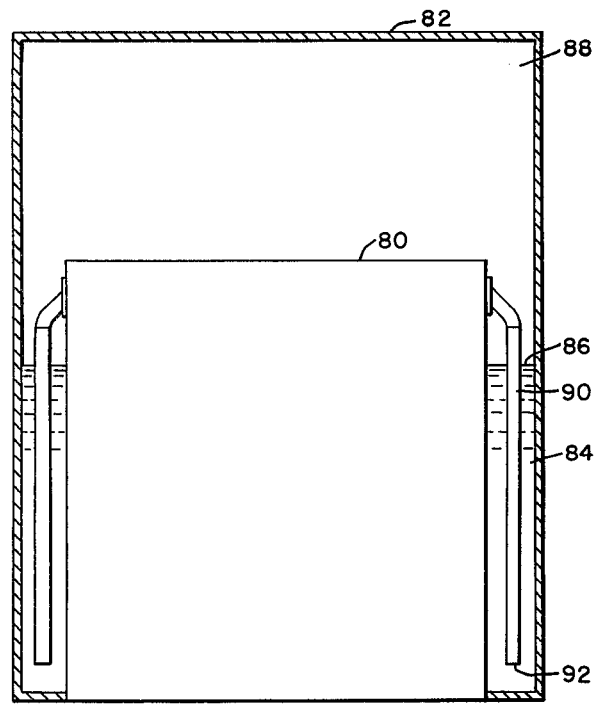

Referring now to FIG. 3, an alternative form of the pressure-suppressing system is shown. The latter form of the invention is intended for those applications wherein the configuration of the outer container is such that a relatively large air or vapor space can be maintained above the liquid pool thereof. As in the previous example of this invention, there is an inner or reactor container 80, which would enclose the nuclear portion of the plant (not shown) in nuclear power plant applications. Spaced outwardly of and substantially surrounding the inner container 80 is an outer container 82. The outer container 82 forms an annular chamber 84, which surrounds the vertical area of the inner container 80. The outer container 82 also encloses a vapor space 88 above the inner container 80. A plurality of vent tubes 90 couple the interior of the inner container 80 with the annular chamber 84 and terminate with their open outer ends a short distance above the bottom of the annular chamber 84. Thus, the discharge end 92 of the vent tube 90 is submerged in the water contained in the annular chamber 84 with the top of the water level being indicated by reference character 86. Sealably secured hatches (not shown) can be located at the top of the outer container 82 and also at the top of the inner container 80 in order to provide accessibility to the interior of each of the containers 80 and 82. Hatches can also be located at other suitable locations on the containers 80 and 82, if desired.

In operation, the steam-air mixture which results from an accident within the inner container 80 flows from inside the reactor container 80, through the vent tubes 90, and into the lower portion of the annular chamber 84 from the discharge end 92 of each vent tube 90. The steam-air mixture then rises upwardly through the water in the annular chamber 84. During this later process the steam condenses, and the air bubbles flow upwardly through the water and into the vapor space 88 above the reactor container 80, where the air and any radioactive materials that may be carried by the air are confined. The amount of pressure developed within the two containers 80 and 82 is determined in the same manner as previously described for FIGS. 1 and 2. Distribution grids and slots in the vent tubes 90 can also be used for this arrangement, such as previously described for FIGS. 1 and 2, in order to provide better distribution and more intimate mixing between the steam-air mixture and the water contained in the annular chamber 84, in certain applications.

The vent tube 90 can also be extended downwardly to a point only a short distance above the bottom of the annular chamber 84. The steam-air mixture, which flows from the discharge end 92 of each vent tube 90, impinges upon the bottom of the annular chamber 84 causing its flow to be distributed radially and turbulently so as to make more intimate contact with the water in the annular chamber 84. If initially sufficient pressure is developed within the inner container 80 as a result of an accident the resulting steam-air mixture can blow some or all of the water in the annular chamber 84 into the vapor space 88. Thus the water originally in the annular chamber 84 can be broken up into small water droplets so as to encompass the entire vapor space 88 as well as the annular chamber 84. Simultaneously, the steam-air mixture is also forced into the vapor space 88. As a result there is intimate mixing between the water droplets and the steam-air mixture, resulting in a more rapid condensation of the steam issuing from the inner container 80 with a quicker reduction in the amount of pressure buildup within the inner container 80.

While there have been shown and described what are at present considered to be the preferred embodiments of the invention, modifications thereto will readily occur to those skilled in the art. For example, the outer container 28 or 82 can be annexed to one side of the inner container 14 or 80 or can be a separate structure entirely removed from the inner container but coupled thereto by one or more vent tubes 46 or 90. As previously described the separate container would contain a pool of water into which the lower portions of the vent tubes would be submerged in the same manner as previously described in connction with FIG. 1 or 3, except that the inner container would not be contained therein. Alternatively the escaping fluid, instead of being cooled and condensed by the liquid in the outer container, could be dissolved or otherwise absorbed by the aforementioned liquid for example where an escaping quantity of gaseous ammonia is discharged into a water pool and the ammonia goes into solution to minimize the pressure build-up within the containers.

It is not desired, therefore, that the invention be limited to the specific arrangements shown and described; rather, it is intended to cover in the appended claims all such modifications as fall within the true spirit and scope of the invention.

We claim as our invention:

1. A pressure-suppressing arrangement comprising an inner container capable of containing pressurized fluid-handling equipment therein; a sealed outer container substantially surrounding and spaced outwardly of said inner container so as to form an annular chamber therebetween; means for separating said annular chamber into a vapor space in the lower portion of said annular chamber and a liquid chamber above said vapor space; a pool of liquid partially filling said liquid chamber and thereby forming a plenum chamber above said pool; conduit means extending through said pool and coupling said plenum chamber to said vapor space to conduct non-condensible vapors from said plenum chamber to said vapor space; and a plurality of vent tubes disposed in said annular chamber, each of said vent tubes having one end communicating with the interior of said inner container and having the other end extending below the surface of said pool to discharge directly into said pool any fluid escaping from said fluid-handling equipment into said inner container.

2. A pressure-suppressing arrangement comprising an inner container capable of containing a reactor vessel and related components for handling a pressurized liquid coolant for said vessel therein; a sealed outer container juxtaposed and surrounding said inner container so as to form an annular chamber therebetween; means for separating said annular chamber into a vapor space in the lower portion of said annular chamber and a liquid chamber above said vapor space; a pool of liquid partially filling said liquid chamber and thereby forming a plenum chamber above said pool; and conduit means extending through said pool and coupling said plenum chamber to said vapor space to conduct non-condensible vapors from said plenum chamber to said vapor space; at least one of said inner and said outer containers being constructed of radiation shielding material; a plurality of vertical compartment plates extending from the bottom of said liquid chamber to said plenum chamber and disposed within said liquid chamber so as to form individual compartments; a plurality of vent tubes disposed in said annular chamber, each of said vent tubes having one end communicating with the interior of said inner container and having the other end discharging into a selected one of said compartments any fluid escaping from said reactor and said related components into said inner container near the bottom of said pool so as to cause the fluid to flow radially and turbulently to produce a more intimate mixing of said fluid with said liquid; and at least one distribution grid within each compartment submerged in said pool but disposed above the discharge end of said vent tube so as to distribute said fluid more intimately with said liquid in said pool.

References Cited by the Examiner

UNITED STATES PATENTS

| | | | |
|---|---|---|---|
| 1,138,202 | 5/1915 | Erlwein et al. | 261—121 |
| 1,699,198 | 1/1929 | Millmather | 261—121 |
| 1,779,786 | 10/1930 | Unzue | 220—88 |
| 1,844,851 | 2/1932 | Harmon | 55—95 X |
| 1,961,879 | 6/1934 | Harrison et al. | 137—14 |
| 2,468,934 | 5/1940 | Kleyn | 261—123 |
| 2,288,297 | 6/1942 | Naiman | 137—8 |
| 2,708,981 | 5/1955 | Armacost et al. | 55—95 |
| 3,022,238 | 2/1962 | Kolflat | 204—193.2 |
| 3,047,485 | 7/1962 | Ellis | 204—193.2 |
| 3,115,450 | 12/1963 | Schanz | 176—37 |

FOREIGN PATENTS 1,209,632  3/1960  France.

OTHER REFERENCES

Peaceful Uses of Atomic Energy, United Nations (1958), vol. 11, Article by Button et al., pages 66–77; Aamodt, pages 92–100; and Chare et al., pages 107–117.

C & E News, vol. 39, No. 28, July 10, 1961, pp. 21–22.

Ser. No. 358,267, Gauss (A. P. C.), published May 18, 1946.

LEON D. ROSDOL, *Primary Examiner.*

REUBEN EPSTEIN, CARL D. QUARFORTH,
                                  *Examiners.*

P. G. BETHERS, L. DEWAYNE RUTLEDGE,
                              *Assistant Examiners.*